(12) United States Patent
Shin et al.

(10) Patent No.: US 11,263,515 B2
(45) Date of Patent: Mar. 1, 2022

(54) HETEROGENEOUS PROCESSOR ARCHITECTURE FOR INTEGRATING CNN AND RNN INTO SINGLE HIGH-PERFORMANCE, LOW-POWER CHIP

(71) Applicants: UX FACTORY CO., LTD., Daejeon (KR); Dongjoo Shin, Anyang-si (KR)

(72) Inventors: Dongjoo Shin, Anyang-si (KR); Jinmook Lee, Seosan-si (KR); Jinsu Lee, Daegu (KR); Ju Hyoung Lee, Daegu (KR)

(73) Assignees: UX FACTORY CO., LTD., Daejeon (KR); Dongjoo Shin, Anyang-si (KR)

(*) Notice: Subject to any disclaimer, the term of this patent is extended or adjusted under 35 U.S.C. 154(b) by 884 days.

(21) Appl. No.: 15/888,102

(22) Filed: Feb. 5, 2018

(65) Prior Publication Data
US 2019/0236437 A1 Aug. 1, 2019

(30) Foreign Application Priority Data
Jan. 29, 2018 (KR) .................. 10-2018-0010945

(51) Int. Cl.
*G06N 3/08* (2006.01)
*G06N 3/04* (2006.01)

(52) U.S. Cl.
CPC ............. *G06N 3/0445* (2013.01); *G06N 3/08* (2013.01)

(58) Field of Classification Search
CPC .......... G06F 2207/3824; G06F 7/4991; H01L 2924/1433; G05B 2219/34008; G11C 2207/104; F02D 41/1405; F03D 7/046; H04Q 2213/343; H04L 25/0254; Y10S 128/925; G06N 3/0445; G06N 3/08
See application file for complete search history.

(56) References Cited

U.S. PATENT DOCUMENTS

| 10,140,572 B2 * | 11/2018 | Bittner, Jr. ............... G06N 3/08 |
| 2017/0103300 A1 * | 4/2017 | Henry ..................... G06F 7/483 |
| 2017/0169567 A1 * | 6/2017 | Chefd'hotel .......... G06T 7/0012 |

(Continued)

OTHER PUBLICATIONS

V. Groza and B. Noory, "Parametric mapping of neural networks to fine-grained FPGAs," Signals, Circuits and Systems, 2003. SCS 2003. International Symposium on, Iasi, Romania, 2003, pp. 541-544 vol. 2, doi: 10.1109/SCS.2003.1227109. (Year: 2003).*

(Continued)

*Primary Examiner* — Kakali Chaki
*Assistant Examiner* — Johnathan R Germick
(74) *Attorney, Agent, or Firm* — Revolution IP, PLLC

(57) ABSTRACT

A heterogeneous processor architecture for integrating a convolutional neural network (CNN) and a recurrent neural network (RNN) into a single high-performance, low-power chip in a neural network processor architecture, the heterogeneous processor architecture includes: an on-chip integrated circuit including a CNN operator for processing the CNN, an RNN operator for processing the RNN, an operation controller for performing control, a memory for storing data which is to be used by the operators, an interface for externally exchanging data, and a data bus through which data moves between constituent elements, wherein a fully-connected layer constituting the CNN performs data processing by sharing the RNN operator.

6 Claims, 9 Drawing Sheets

(56) References Cited

U.S. PATENT DOCUMENTS

2019/0212981 A1* 7/2019 Park .................. G06N 3/04

OTHER PUBLICATIONS

Y. Kang and J. Chung, "A dynamic fixed-point representation for neuromorphic computing systems," 2017 International SoC Design Conference (ISOCC), Seoul, 2017, pp. 44-45, doi: 10.1109/ISOCC.2017.8368819. (Year: 2017).*

Na, Taesik & Mukhopadhyay, Saibal. (2016). Speeding up Convolutional Neural Network Training with Dynamic Precision Scaling and Flexible Multiplier-Accumulator:. 58-63. 10.1145/2934583.2934625. (Year: 2016).*

Rajagopal, Vasanthakumar & Ramasamy, Chandra & Vishnoi, Ashok & Narayana, Raj & Miniskar, Narasinga & Pasupuleti, Sirish. ( 2018). Accurate and Efficient Fixed Point Inference for Deep Neural Networks. 1847-1851. 10.1109/ICIP.2018.8451268. (Year: 2018).*

Duckhwan Kim and Taesik Na and Sudhakar Yalamanchili and Saibal Mukhopadhyay (2017). NeuroTrainer: An Intelligent Memory Module for Deep Learning Training. CoRR, abs/1710.04347. (Year: 2017).*

Xuan Yang and Jing Pu and Blaine Burton Rister and Nikhil Bhagdikar and Stephen Richardson and Shahar Kvatinsky and Jonathan Ragan-Kelley and Ardavan Pedram and Mark Horowitz (2016). A Systematic Approach to Blocking Convolutional Neural Networks. CoRR, abs/1606.04209. (Year: 2016).*

* cited by examiner

Output Image

Fig. 9

|  | 16-bit fixed point | Clustering table |
|---|---|---|
| Area | 1890 | 1380 (per 1 Mult.) |
| Power | 0.32mW | 0.068mW (per 1 Mult.) |
| Operation time | 7.1ns | 0.49ns |

Simulation results on 65nm @ 200MHz, 1.2V

HETEROGENEOUS PROCESSOR ARCHITECTURE FOR INTEGRATING CNN AND RNN INTO SINGLE HIGH-PERFORMANCE, LOW-POWER CHIP

BACKGROUND OF THE INVENTION

Field of the Invention

The present invention relates to a heterogeneous processor architecture for integrating a convolutional neural network (CNN) and a recurrent neural network (RNN) into a single high-performance, low-power chip and, more particularly, to a heterogeneous processor architecture for integrating a CNN operator and an RNN operator into a single high-performance, low-power chip to maximize energy efficiency in operation of the CNN and RNN in a neural network processor.

Description of the Related Art

Recently, along with development of the field of deep learning, demand for neural networks has been increasing in various fields.

A convolutional neural network (CNN), which is one type of neural network, is advantageous in terms of extraction and classification of features of an image and is used for object recognition, facial recognition, etc. A recurrent neural network (RNN), which is another type of neural network, is advantages in terms of sequential information processing such as processing of voice or a character string and is used for speech recognition, translation, etc.

The CNN and the RNN may be used for more complicated applications such as gesture recognition or image captioning when they are used together.

To improve the performance of a neural network, a larger and more complicated neural network is being used and operation necessary for neural network processing and required data amount are being increasing exponentially.

Therefore, a neural network dedicated processor chip for effectively performing neural network processing has been developed.

However, according to an existing neural network dedicated processor, operators having the same architecture in one processor process neural network operations and the CNN and the RNN in this processor are greatly different in operation. Therefore, the CNN and the RNN cannot be simultaneously optimized and the performance of each of the CNN and the RNN is deteriorated relative to performance in the case in which each of the CNN and the RNN is constructed as a single chip, thereby resulting in reduction of overall operation efficiency.

In addition, if the CNN and RNN are not properly designed as one chip, the performance of each of the CNN and the RNN is degraded in comparison with the case in which each of the CNN and the RNN is designed as a single chip and, therefore, overall operation efficiency is reduced.

SUMMARY OF THE INVENTION

Therefore, the present invention has been made in view of the above problems, and it is an object of the present invention to provide a heterogeneous processor architecture for integrating a CNN and an RNN into a single high-performance, low-power chip, wherein the number of data bits required for activation of the CNN is reduced and, at the same time, an input segmentation form is adjusted so as to minimize external memory access, a multiplier based on a clustering table is used to minimize external memory access to an RNN weight parameter, power efficiency and area efficiency of an operator are maximized so that one processor chip can process both the CNN and the RNN to have high energy efficiency, and a controller, a memory, a data bus, and an external interface are shared so that an area and power consumption are reduced as compared with a neural network processor of a single architecture type or a simple integrated architecture of the CNN and the RNN.

In accordance with the present invention, the above and other objects can be accomplished by the provision of a heterogeneous processor architecture for integrating a convolutional neural network (CNN) and a recurrent neural network (RNN) into a single high-performance, low-power chip in a neural network processor architecture. The heterogeneous processor architecture includes an on-chip integrated circuit including a CNN operator for processing the CNN, an RNN operator for processing the RNN, an operation controller for performing control, a memory for storing data which is to be used by the operators, an interface for externally exchanging data, and a data bus through which data moves between constituent elements. The CNN operator processes input data through a hybrid segmentation scheme of combining an image segmentation scheme and a channel segmentation scheme. A fully-connected layer constituting the CNN performs data processing by sharing the RNN operator.

A length of an integer part and a length of a fractional part in the CNN operator may be fixed in the same layer and may be dynamically varied in different layers.

The CNN operator may automatically change a length of an integer part and a length of a fractional part by detecting an overflow coefficient and an underflow coefficient.

The CNN operator may decrease the length of the fractional part and increases the length of the integer part when an overflow coefficient is larger than a threshold value and may decrease the length of the integer part and increases the length of the fractional part when an underflow coefficient is larger than the threshold value.

The RNN operator may process a multiplication operation through a clustering table multiplier by applying weight clustering.

The CNN operator and the RNN operator may share the memory, the operation controller, the data bus, and the interface.

BRIEF DESCRIPTION OF THE DRAWINGS

The above and other objects, features and other advantages of the present invention will be more clearly understood from the following detailed description taken in conjunction with the accompanying drawings, in which:

FIG. 9 is a diagram illustrating an effect of an operator through a clustering multiplication according to an embodiment of the present invention.

DETAILED DESCRIPTION OF THE INVENTION

Figure 1:
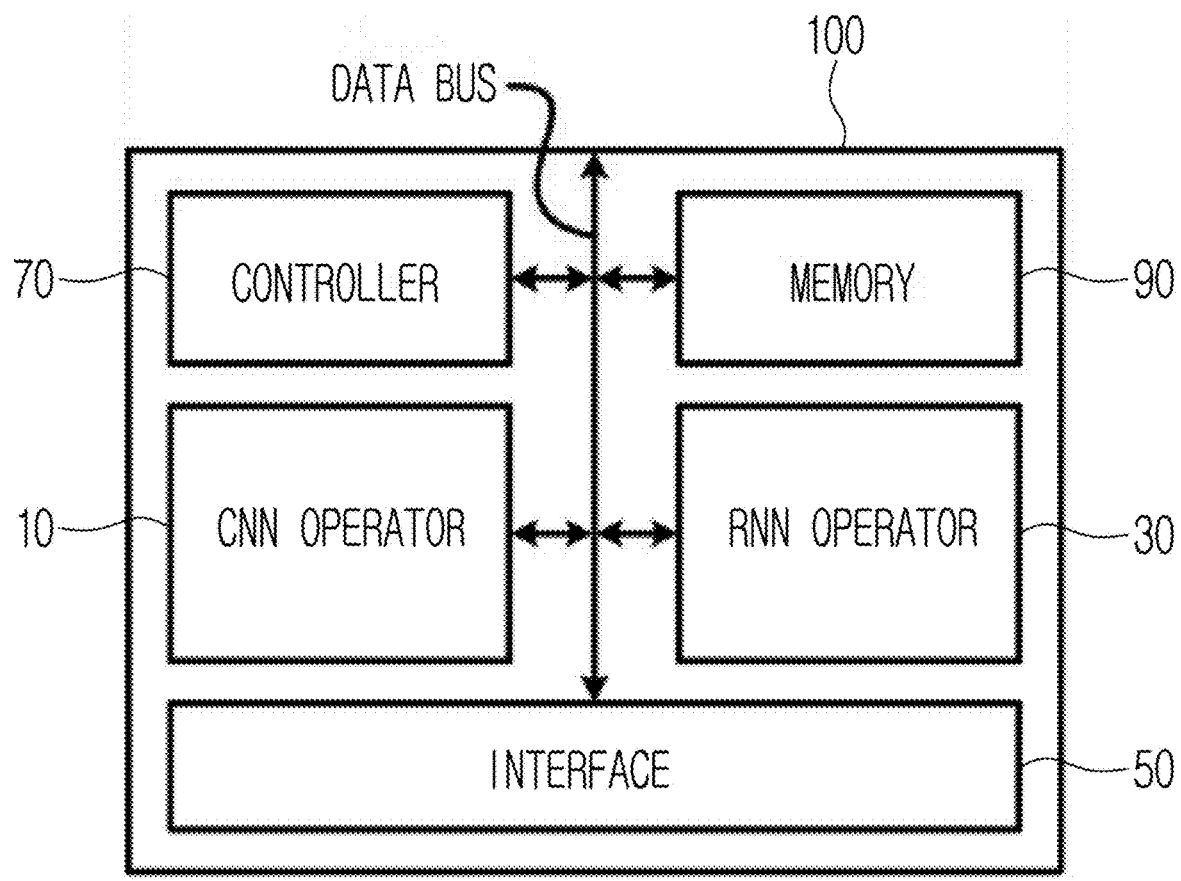
FIG. 1 is a block diagram of a neural network processor having a heterogeneous architecture according to an embodiment of the present invention.

Hereinafter, embodiments of the present invention will be described in detail with reference to the accompanying drawings so that the above and other aspects of the present invention will be easily understood and realized by those skilled in the art.

In an existing neural network processor, operators having the same architecture in one processor have processed neural network operation and a neural network processor capable of simultaneously processing a CNN and an RNN in an optimized manner has not yet been reported.

The CNN has fewer weight parameter values because the CNN is reused multiple times even while a convolution filter of the network performs one-time inference, whereas the RNN has a considerably greater number of weight parameter values than the number of parameter values of the CNN because each connection of the network has a different weight parameter value.

In addition, while the RNN has a one-dimensional (1D) vector as network input, the CNN has a two-dimensional (2D) image as network input. Therefore, the CNN normally has as many neurons (activations) constituting the network as the square of the neurons of the RNN.

If the CNN and the RNN having different characteristics as described above are processed by operators having the same architecture, memory access is unnecessarily increased and operation efficiency is reduced, so that lowering power consumption of the entire system has limitations.

Therefore, in the present invention, a CNN operator 10 and an RNN operator 30 are configured by a heterogeneous architecture to have energy efficiency optimized for a CNN and an RNN and are integrated into one chip.

A heterogeneous processor architecture 100 for integrating the CNN and the RNN into a single high-performance, low-power chip according to an embodiment of the present invention is configured as an on-chip integrated circuit including the CNN operator 10 for processing the CNN, the RNN operator 30 for processing the RNN, an operation controller 70 for performing control, a memory 90 for storing data which is to be used by the operators 10 and 30, an interface 50 for externally exchanging data, and a data bus through which data moves between constituent elements, in a neural network processor architecture.

The CNN operator 10 is configured to reduce the number of data bits required for activation of the CNN and, at the same time, to adjust an operation order to minimize external memory access. The RNN operator 30 may minimize external memory access to weights and maximize operation efficiency, power efficiency, and area efficiency thereof.

The CNN largely consists of a convolutional layer and a fully-connected layer. Since each connection of the network has a different weight parameter value in the fully-connected layer, the CNN in the fully-connected layer has the same characteristics as the RNN.

In integrating the CNN operator 10 and the RNN operator 30 into a single chip, since both the fully-connected layer and the RNN may be represented as a matrix multiplication of the same form, the fully-connected layer of the CNN performs data processing by sharing the RNN operator 30, thereby raising energy efficiency and area efficiency.

The CNN operator 10 and the RNN operator 30 greatly raise area efficiency on a chip by sharing the operation controller 70, the memory 90, the data bus, and the interface 50 and raise operation efficiency so as to effectively cope with various network allocation types.

Meanwhile, the data bus and the interface 50 are constructed according to connections between the operation controller 70, the memory 90, the CNN operator 10, and the RNN operator 30. To share the data bus and the interface 50, the operation controller 70 and the memory 90 should first be shared.

The operation controller 70 is operated by inserting data necessary for operation and configuring an operation register after setting a configuration register of the CNN operator 10 and the RNN operator 30 suitable for the size and type of the networks.

If the CNN operator 10 and the RNN operator 30 are provided with respective independent memories, the usage rates of the respective memories become different according to throughput of the CNN and the RNN and, while either the CNN or the RNN is processed, one memory is not used at all.

Therefore, the present invention causes the CNN operator 10 and the RNN operator 30 to share one memory 90, thereby maximizing the usage rate of the memory 90.

As described above, the configuration register, the operation register, and the operation controller 70 for controlling data input and output are shared by the CNN operator 10 and the RNN operator 30, so that an area occupied by the operation controller 70 is reduced and, at the same time, the data bus, the memory 90, and the interface 50 can be appropriately allocated according to each operator.

The present invention proposes a hybrid input segmentation method to minimize external memory access to the CNN.

In operation of the CNN, a weight parameter value of each of an input layer image, an output layer image, and a convolution filter ranges from about 10 MB to about 100 MB.

However, the magnitude of the memory 90, which is an on-chip memory, is limited to a few hundred kB to a few MB.

Accordingly, input of the CNN should be segmented. The CNN operator 10 is driven by a hybrid segmentation scheme by combining an image segmentation scheme and a channel segmentation scheme so as to effectively process input data through the on-chip memory 90 of limited capacity.

Figure 2:
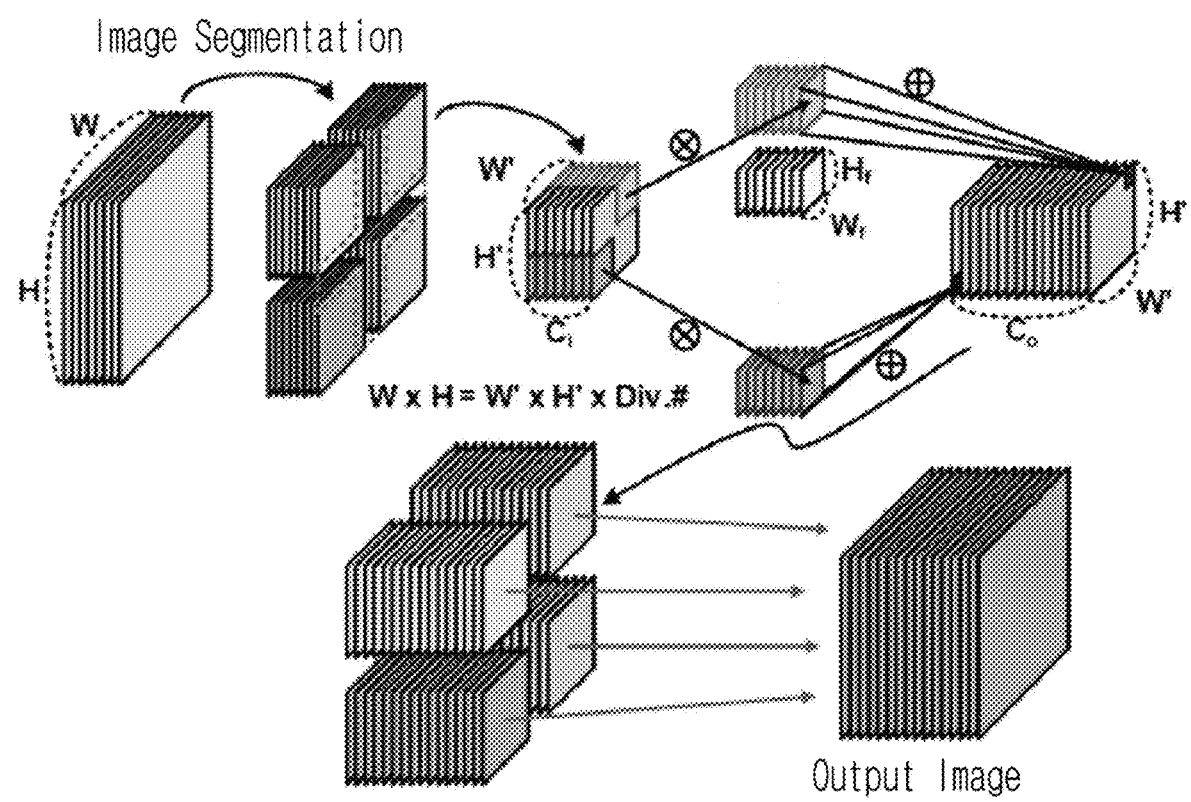
FIG. 2 is a diagram illustrating an image input segmentation scheme according to an embodiment of the present invention.

In segmenting an image, the width W of an input image and the height H of the input image are decreased in proportion to the number of segmentations, as illustrated in FIG. 2.

Each of segmented image groups is independently processed. In this case, since a weight parameter value of each segmented image group should be retrieved multiple times, external memory access to the weight parameter value is increased.

Figure 3:
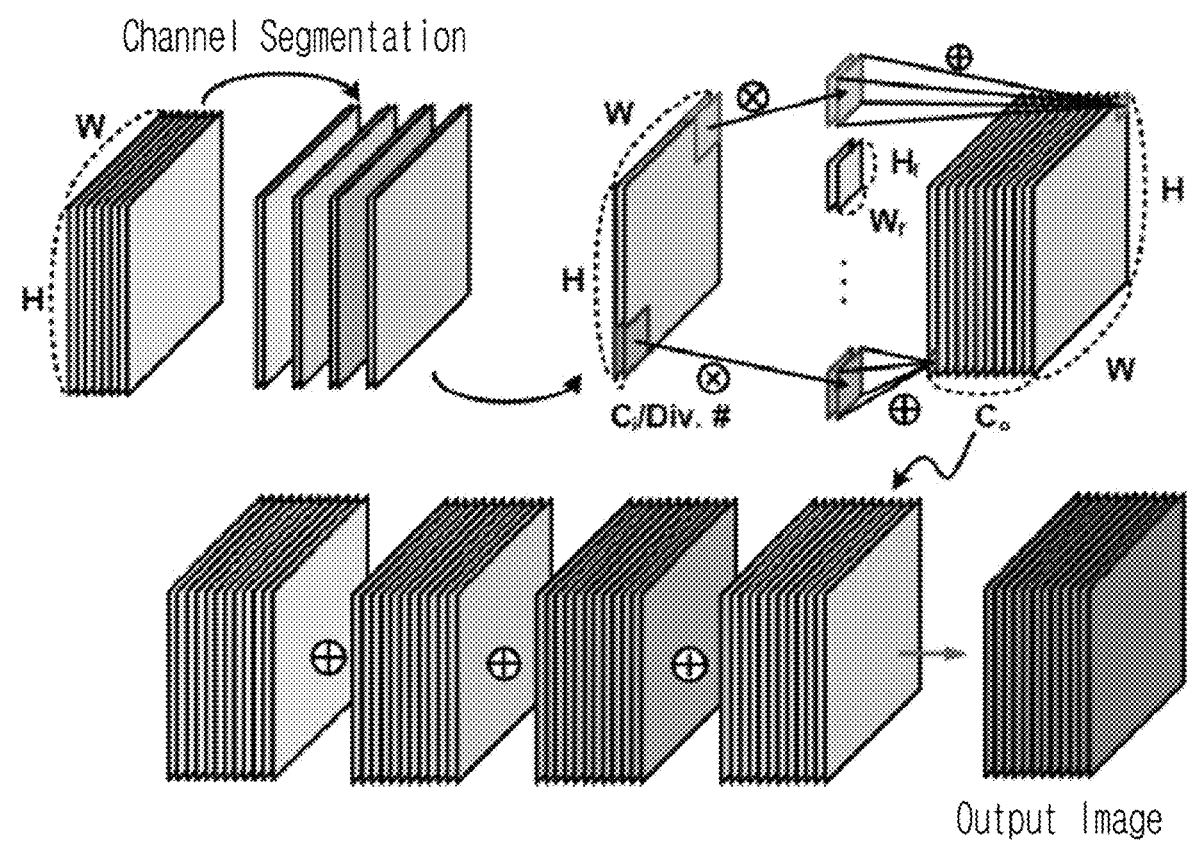
FIG. 3 is a diagram illustrating a channel input segmentation scheme according to an embodiment of the present invention

On the other hand, in channel segmentation, although the width W and height H of an input image are the same as the width W and height H of an original input image, the number of channels is decreased as illustrated in FIG. 3.

In this case, since a retrieved weight parameter value can be used for all images, multiple external memory access to the weight parameter value is not needed.

However, final output should be generated by accumulating partial output results and additional external memory access to the partial output results is needed.

Image segmentation is advantageous when the size of a weight parameter value is relatively less than the size of an image, whereas channel segmentation is advantageous when the size of an image is relatively less than the size of a weight parameter value.

Figure 4:
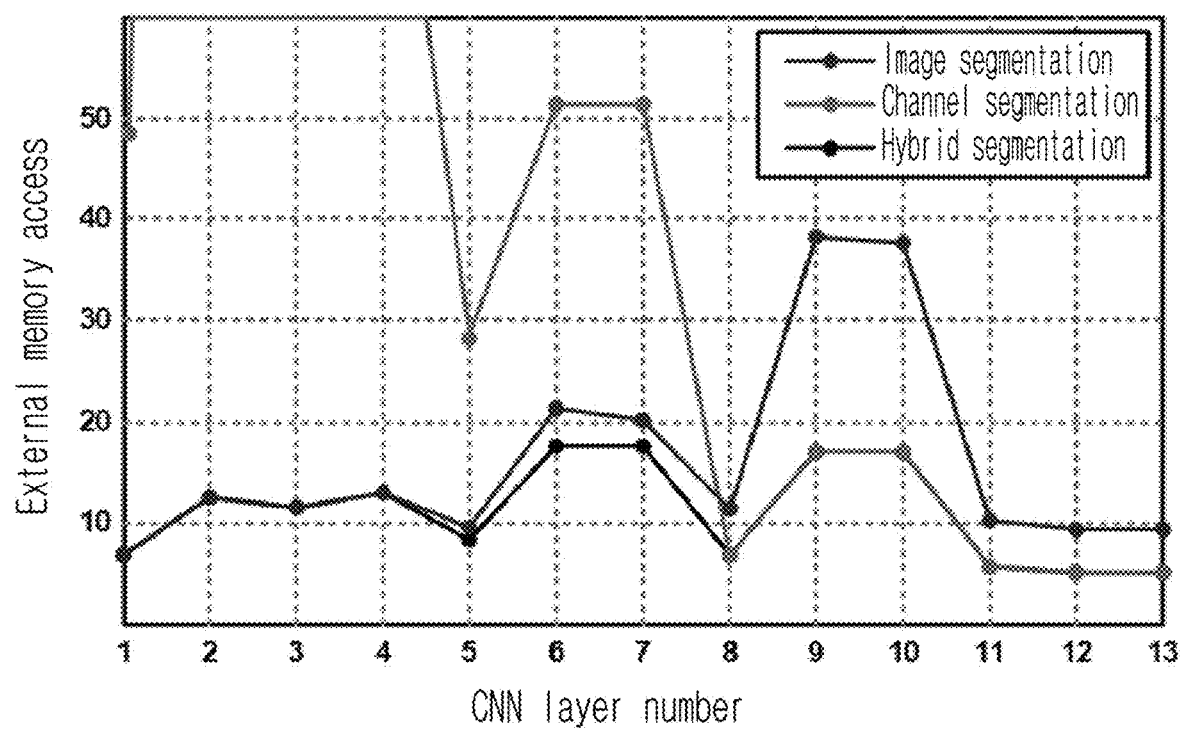
FIG. 4 is graph illustrating an effect of a hybrid input segmentation scheme according to an embodiment of the present invention.

Accordingly, the present invention uses a hybrid segmentation method of combining these two methods. If the hybrid segmentation method optimized for each layer of the CNN is used, processing through minimized external memory access is possible even in various layer forms as illustrated in FIG. 4.

The data distribution and data range of each layer image of the CNN greatly vary according to layer.

Although it is effective to use a floating point format to support data of a wide range, hardware cost for floating point operation is much higher than hardware cost for fixed point operation.

The present invention proposes a dynamic fixed point per layer which can be self-adjusted in real time in order to take advantage of wide representation range of floating point operation and energy efficiency of fixed point operation.

The length of an integer part and the length of a fractional part in the CNN operator 10 are fixed in the same layer but are dynamically varied in different layers.

Accordingly, since the length of an integer part and the length of a fractional part are fixed in the same layer while maintaining characteristics of a floating point throughout the network, it is possible to perform fixed point operation.

To select the length of an integer part and the length of a fractional part of each layer, offline learning has conventionally been used.

In this case, the length of the integer part and the length of the fractional part are trained such that the sum of errors of all learned images is minimized.

The length of the integer part and the length of the fractional part determined in such a way are identically used with respect to all images at run time.

In this approach method, additional offline learning is needed and the length of the integer part and the length of the fractional part which are common to all images are provided.

Figure 5:
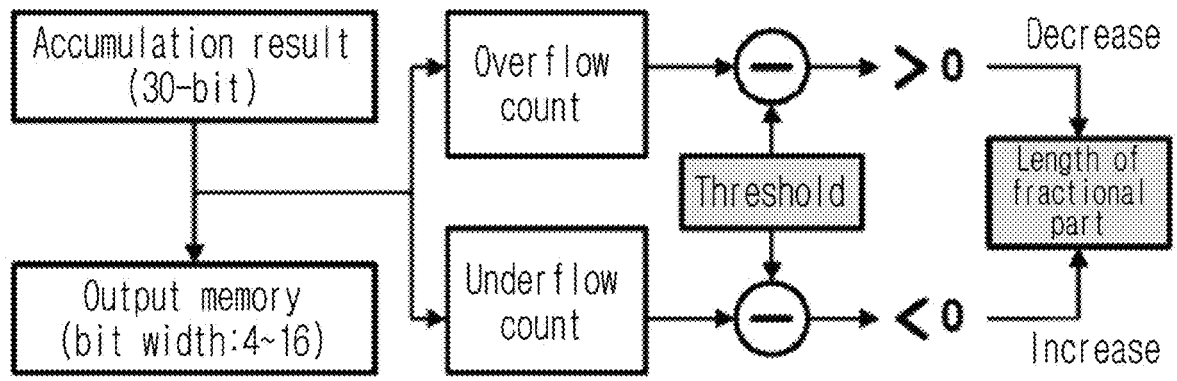
FIG. 5 is a diagram illustrating an overflow detector according to an embodiment of the present invention.

In a real-time self-adjustment method of the present invention, the length of the integer part and the length of the fractional part are dynamically optimized for a currently input image by performing overflow monitoring, as illustrated in FIG. 5.

If a value which cannot be represented by a currently expressible maximum value occurs, an overflow coefficient is increased.

If the overflow coefficient is greater than a threshold value, the length of the fractional part is decreased and the length of the integer part is increased to reduce overflow.

On the contrary, if the currently expressible maximum value is larger than a required maximum value by two times or more, i.e., if an underflow coefficient is greater than the threshold value, the length of the integer part is decreased and the length of the fractional part is increased.

This method does not require offline chip pre-training and can achieve the same performance even with fewer bits because the length of the integer part and the length of the fractional part are self-adjusted suitably for currently processed data.

Figure 6:
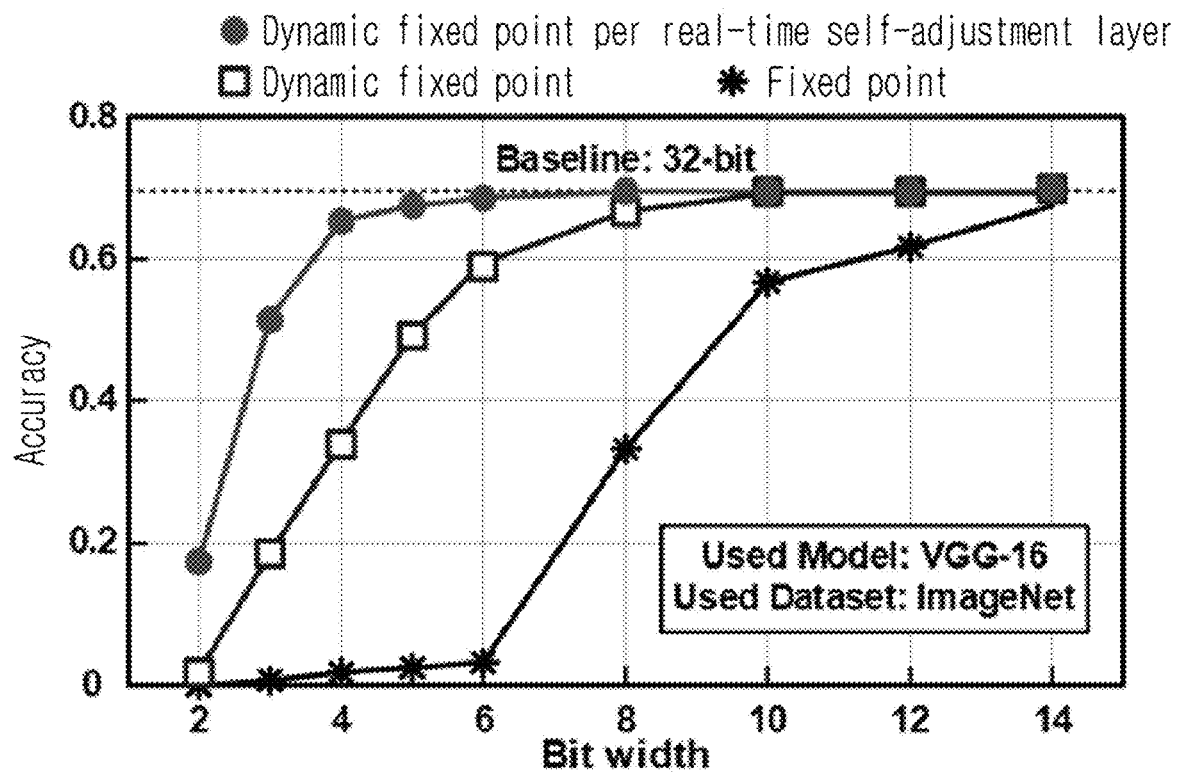
FIG. 6 is a graph illustrating an effect of a dynamic fixed point per real-time self-adjustment layer according to an embodiment of the present invention.

That is, the effect of a dynamic fixed point per real-time self-adjustment layer exhibits performance almost similar to that of 32 bits even in 4-bit activation, as illustrated in FIG. 6.

In implementing this method, only an additional counter for monitoring overflow and underflow is needed and the counter is present in a core in which resultant values are finally counted.

In a multilayer perceptron (MLP) and an RNN, a weight may be clustered into a fewer level number.

If an original weight is a data type of a 16-bit fixed point, the weight may have 256 different values.

However, if the weight is clustered into a 4-bit index, the weight may have 16 different values.

In this case, the weight does not mean 4 bits.

Through 4-bit weight clustering, the same performance as performance of 16 bits can be expected in the MLP and the RNN.

The present invention proposes a method of applying weight clustering to an RNN operator and replacing multiplication operation with clustering table inquiry.

In configuration of a clustering table, multiplication between an input and 16 clustered weights is also clustered into 16 values.

Accordingly, each entry of the clustering table includes a precalculated multiplication result between a 16-bit fixed point input and a 16-bit fixed point weight.

In multiplication using the configured clustering table, only a clustered index is decoded and a result is obtained from a precalculated entry.

Since only a 4-bit index rather than a 16-bit index needs to be loaded, external memory access can be reduced by 75%.

If a zero-skip scheme is used, since weight load can be skipped during input of zero, external memory access can be reduced by 92% on average.

This method causes improved performance in terms of all of an area, power, and an operation time as compared with a conventional fixed-point multiplier.

Figure 7:
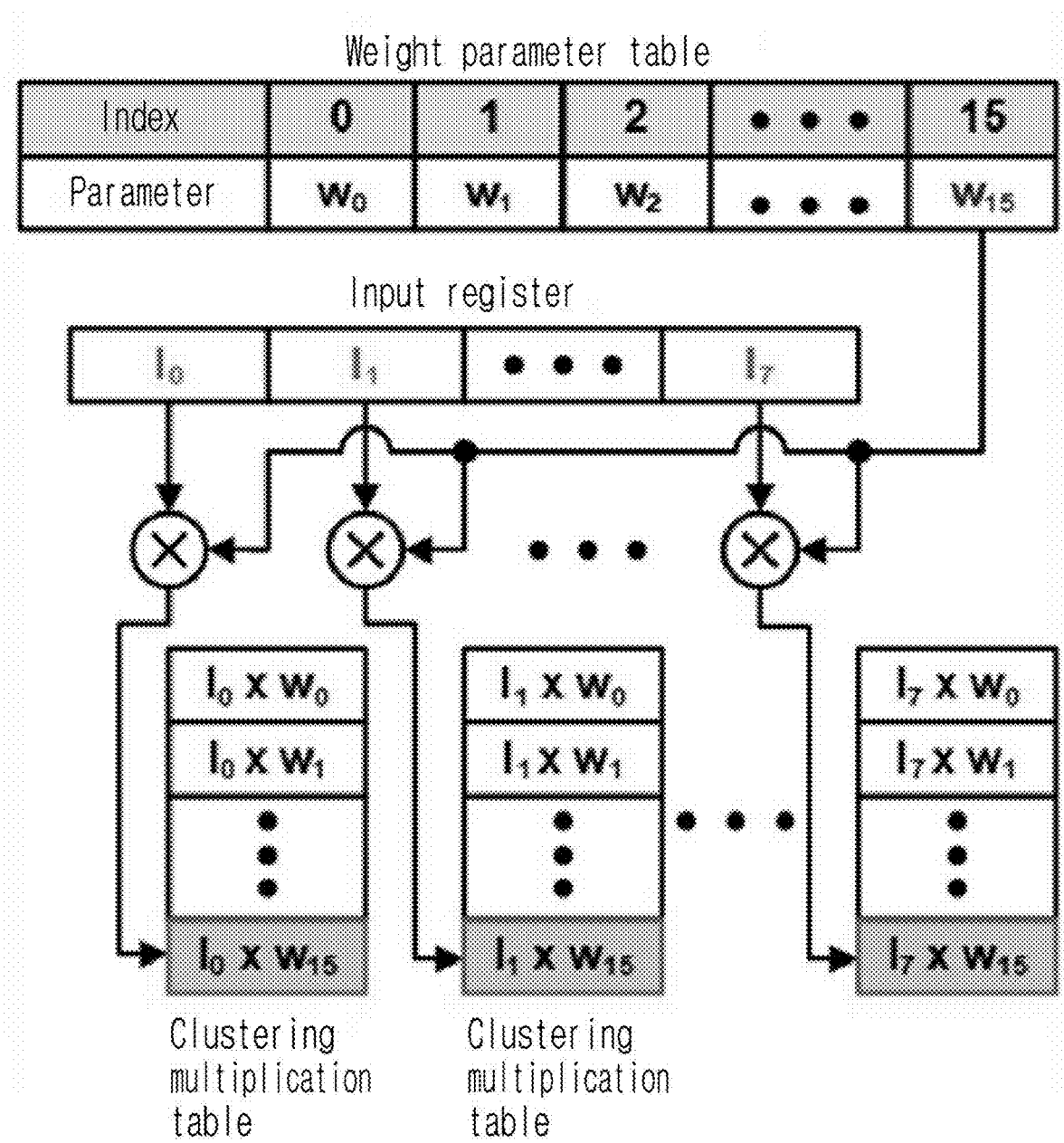
FIG. 7 is a diagram illustrating a process of generating a clustering multiplication table according to an embodiment of the present invention.

A clustering table illustrated in FIG. 7 includes a precalculated multiplication result between input and a clustered weight.

Figure 8:
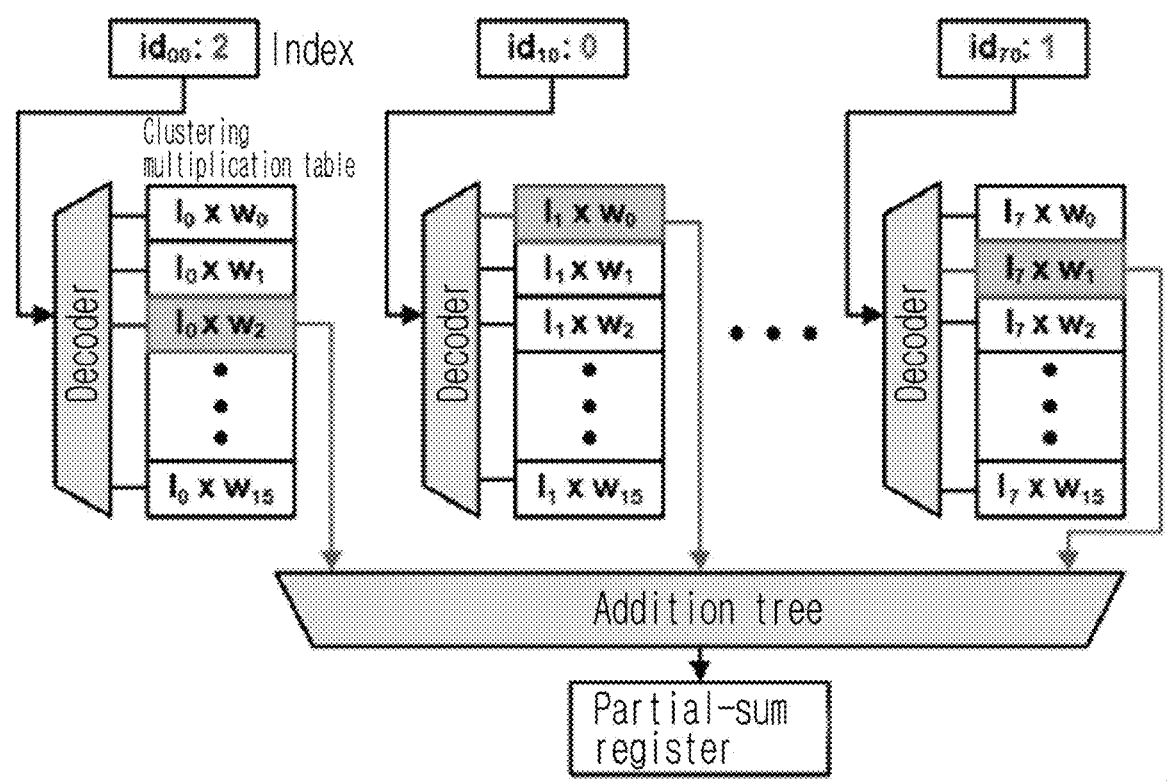
FIG. 8 is a diagram illustrating a multiplication process through a clustering multiplication table according to an embodiment of the present invention.

In multiplication using the configured clustering table, only a clustered index is decoded and a result is obtained from a precalculated entry, as illustrated in FIG. 8.

This method causes improved performance in terms of all of area, power, and operation time as compared with a conventional fixed-point multiplier, as illustrated in FIG. 9.

Figure 10:
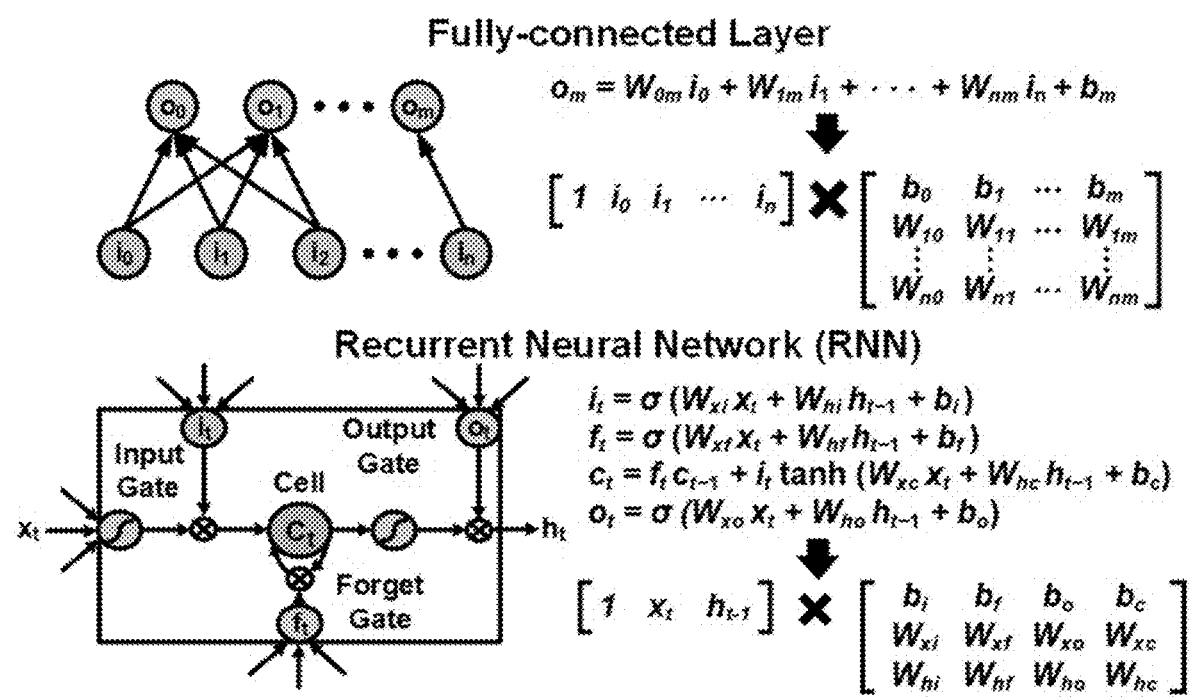
FIG. 10 is a diagram illustrating a fully-connected layer of a CNN and an RNN which are represented by a matrix multiplication of the same form according to an embodiment of the present invention.

As illustrated in FIG. 10, since a fully-connected layer of a CNN and an RNN can be represented by a matrix multiplication of the same type, the RNN operator is configured to be shared, thereby raising energy efficiency and area efficiency.

As is apparent from the above description, according to the present invention, the number of data bits required for activation of a CNN is reduced and, at the same time, an input segmentation form is adjusted so as to minimize external memory access. Since a multiplier based on a clustering table is used, external memory access to an RNN weight parameter is minimized and power efficiency and area efficiency of an operator are maximized so that one processor chip can process both the CNN and the RNN to have high energy efficiency. A controller, a memory, a data bus, and an external interface are shared so that an area and power consumption are reduced as compared with a neural network processor of a single architecture type or a simple integrated architecture of the CNN and the RNN.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A heterogeneous processor architecture for integrating a convolutional neural network (CNN) and a recurrent neural network (RNN) into a single high-performance, low-power chip in a neural network processor architecture, the heterogeneous processor architecture comprising:
    an on-chip integrated circuit including:
        a processor configured to operate a CNN operator for processing the CNN, an RNN operator for processing the RNN, and an operation controller for performing control;
        a single memory for storing data which is to be used by the operators,
        wherein the CNN operator and the RNN operator share the single memory;
        an interface for externally exchanging data; and
        a data bus through which data moves between constituent elements,
    wherein a fully-connected layer constituting the CNN performs data processing by sharing the RNN operator,
    wherein the on-chip integrated circuit is configured to process both the CNN operator and the RNN operator simultaneously,
    wherein the CNN operator processes input data through a hybrid segmentation scheme of combining an image segmentation scheme and a channel segmentation scheme,
    wherein the input data is
        processed in the image segmentation scheme upon a size of a weight parameter value being less than a size of an image, and
        processed in the channel segmentation scheme upon the size of the image being less than the size of the weight parameter value.

2. The heterogeneous processor architecture according to claim 1, wherein a length of an integer part and a length of a fractional part in the CNN operator are fixed in the same layer and are dynamically varied in different layers.

3. The heterogeneous processor architecture according to claim 1, wherein the CNN operator automatically changes a length of an integer part and a length of a fractional part by detecting an overflow coefficient and an underflow coefficient.

4. The heterogeneous processor architecture according to claim 2, wherein the CNN operator decreases the length of the fractional part and increases the length of the integer part when an overflow coefficient is larger than a threshold value and decreases the length of the integer part and increases the length of the fractional part when an underflow coefficient is larger than the threshold value.

5. The heterogeneous processor architecture according to claim 1, wherein the RNN operator processes a multiplication operation through a clustering table multiplier by applying weight clustering.

6. The heterogeneous processor architecture according to claim 1, wherein the CNN operator and the RNN operator share the operation controller, the data bus, and the interface.

* * * * *